(12) United States Patent
Crabtree

(10) Patent No.: US 7,076,112 B2
(45) Date of Patent: Jul. 11, 2006

(54) IMAGE PROCESSING METHOD

(76) Inventor: John C. R. Crabtree, 508 Archway Road, London, N6 4NA (GB)

( * ) Notice: Subject to any disclaimer, the term of this patent is extended or adjusted under 35 U.S.C. 154(b) by 592 days.

(21) Appl. No.: 10/222,472

(22) Filed: Aug. 16, 2002

(65) Prior Publication Data

US 2003/0035591 A1    Feb. 20, 2003

(30) Foreign Application Priority Data

Apr. 26, 2005 (JP) .............................. 2005-128378

(51) Int. Cl.
*G06K 9/40* (2006.01)
*G06K 9/00* (2006.01)
(52) U.S. Cl. ...................................... 382/254; 382/162
(58) Field of Classification Search ................ 382/162, 382/164, 173, 181, 190, 203, 205, 209, 254, 382/275, 294; 358/1.1, 1.9, 509, 515, 520, 358/530
See application file for complete search history.

(56) References Cited

U.S. PATENT DOCUMENTS

| 5,555,012 A | * | 9/1996 | Ellson et al. ................ 347/217 |
| 5,781,709 A | * | 7/1998 | Usami et al. ................ 358/1.9 |
| 6,072,588 A | * | 6/2000 | Dohnomae .................. 358/1.9 |
| 6,075,614 A | * | 6/2000 | Ohtsuka et al. .............. 358/1.1 |
| 2003/0035591 A1 | * | 2/2003 | Crabtree ...................... 382/254 |

* cited by examiner

*Primary Examiner*—Amir Alavi
(74) *Attorney, Agent, or Firm*—Raymond G. Areaux

(57) ABSTRACT

A method for processing an image is provided. A first image and a second image are provided, and donor pixels in the first image are located which correspond to active pixels on the second image. One of the channels of the first image is selected and a donor pixel is chosen. The pixels of the first image are searched in the region of the donor pixel in order to determine suitable receiver pixels. A transfer of luminance is performed from the donor pixel to these receiver pixels through the receiver pixel array. A second donor pixel is then selected, another search is carried out and a transfer of luminance is again performed. This process is then repeated for each donor pixel.

24 Claims, 13 Drawing Sheets

Figure 1A

This is a picture of Miss Chloe Brown and this text has been fused into the image by Photo Text Fusion.

It is difficult to display the PTF phenomenon in Black and White with a halftone screen which is coarse enough to be reliably photocopied but I hope to demonstrate the effect sufficiently by showing magnified details of this processed image.

This image has been processed by Photo Text Fusion at 425 by 613 pixels, resampled to 1700 by 2450, and then the screen was applied at 30 lines/inch, after greyscale reduction from colour. This text was 24 pixels high and had line widths of approximately 2.7 pixels, anti-alaised, when processed.

John C. R. Crabtree

| 20  | 20  | 20  | 20  | 20  | 20  | 20  | 20  | 20  | 20  | 20  |
|-----|-----|-----|-----|-----|-----|-----|-----|-----|-----|-----|
| 45  | 45  | 45  | 45  | 45  | 45  | 45  | 45  | 45  | 45  | 45  |
| 70  | 70  | 70  | 70  | 70  | 70  | 70  | 70  | 70  | 70  | 70  |
| 95  | 95  | 95  | 95  | 95  | 95  | 95  | 95  | 95  | 95  | 95  |
| 120 | 120 | 120 | 120 | 120 | 120 | 120 | 120 | 120 | 120 | 120 |
| 145 | 145 | 145 | 145 | 145 | 145 | 145 | 145 | 145 | 145 | 145 |
| 170 | 170 | 170 | 170 | 170 | 170 | 170 | 170 | 170 | 170 | 170 |
| 195 | 195 | 195 | 195 | 195 | 195 | 195 | 195 | 195 | 195 | 195 |
| 220 | 220 | 220 | 220 | 220 | 220 | 220 | 220 | 220 | 220 | 220 |
| 245 | 245 | 245 | 245 | 245 | 245 | 245 | 245 | 245 | 245 | 245 |

Figure 2A

| 20  | 29  | 29  | 29  | 20  | 20  | 20  | 20  | 20  | 20  | 20  |
|-----|-----|-----|-----|-----|-----|-----|-----|-----|-----|-----|
| 45  | 54  | 0   | 45  | 45  | 45  | 45  | 45  | 45  | 45  | 45  |
| 70  | 79  | 70  | 70  | 70  | 70  | 70  | 70  | 70  | 70  | 70  |
| 95  | 95  | 95  | 95  | 95  | 95  | 95  | 95  | 95  | 95  | 95  |
| 120 | 120 | 120 | 120 | 120 | 120 | 120 | 120 | 120 | 120 | 120 |
| 145 | 145 | 145 | 145 | 145 | 145 | 145 | 145 | 145 | 145 | 145 |
| 170 | 170 | 170 | 170 | 170 | 170 | 170 | 170 | 170 | 170 | 170 |
| 195 | 195 | 195 | 195 | 195 | 195 | 195 | 255 | 195 | 195 | 195 |
| 220 | 220 | 220 | 220 | 220 | 220 | 95  | 255 | 220 | 220 | 220 |
| 245 | 245 | 245 | 245 | 245 | 255 | 255 | 255 | 245 | 245 | 245 |

Figure 2B

*SearchField* ( n, x/y)

| n | 1 | 2 | 3 | 4 | 5 | 6 | 7 | 8 | 9 | 10 |
|---|---|---|---|---|---|---|---|---|---|----|
| x | 0 | -1 | 1 | 0 | -1 | 1 | -1 | 1 | 0 | -2 |
| y | 1 | 0 | 0 | -1 | 1 | 1 | -1 | -1 | 2 | 0 |

| n | 11 | 12 | 13 | 14 | 15 | 16 | 17 | 18 | 19 | 20 |
|---|----|----|----|----|----|----|----|----|----|----|
| x | 2 | 0 | -1 | -2 | 1 | -2 | 2 | -1 | 2 | 1 |
| y | 0 | -2 | 2 | 1 | 2 | -1 | 1 | -2 | -1 | -2 |

| n | 21 | 22 | 23 | 24 | 25 | 26 | 27 | 28 | 29 | 30 |
|---|----|----|----|----|----|----|----|----|----|----|
| x | -2 | 2 | -2 | 2 | 0 | -3 | 3 | 0 | -1 | -3 |
| y | 2 | 2 | -2 | -2 | 3 | 0 | 0 | -3 | 3 | 1 |

| n | 31 | 32 | 33 | 34 | 35 | 36 | . | . | . | . |
|---|----|----|----|----|----|----|---|---|---|---|
| x | 1 | -3 | 3 | -1 | 3 | 1 | . | . | . | . |
| y | 3 | -1 | 1 | -3 | -1 | -3 | . | . | . | . |

…

IMAGE PROCESSING METHOD

FIELD OF THE INVENTION

This invention relates to the field of image manipulation.

BACKGROUND OF THE INVENTION

The techniques available to graphic artists and video/film editors for the overlay of text on images are limited. The inevitable problem encountered by the designer when overlaying a photograph with text is that of the text colour merging into similarly coloured regions in the background image, rendering the text unreadable.

This problem has been crudely solved by text outlining, text shadow-casting, under-text blocking or text-surround glow etc. These methods all more or less hide the image and make strong graphic impressions that compromise aesthetic intention of the designer. For example, in the overlay of subtitles on video and film it is readily apparent that particular damage is caused to the image content.

The present invention seeks to solve the text readability problems described above in a way that is less destructive to the image than known solutions.

SUMMARY OF THE INVENTION

According to the present invention there is provided a method for processing an image comprising the steps of:
 providing a first image and a second image;
 locating donor pixels in the first image which correspond to active pixels on the second image;
 selecting a channel of the first image;
 selecting a donor pixel;
 searching the pixels, in the first image, in the region of the donor pixel, to determine suitable receiver pixels;
 performing a transfer of luminance from the donor pixel to the receiver pixels through the receiver pixel array; and
 repeating the donor pixel selection, the searching and the performing steps for each donor pixel.

The searching and performing steps may be performed in a predetermined sequence. Where more than one channel is present, such as three colour channels, the method is repeated for each channel. The local pixel group aggregate luminance level may be maintained to preserve the original image.

According to the invention there is further provided a method for processing an image comprising the steps of:
 providing a first image and a second image;
 locating donor pixels in the first image which correspond to active pixels on the second image;
 assessing colour values present in the first image to form a palette;
 selecting a donor pixel;
 searching the pixels, in the first image, in the region of the donor pixel, to determine a suitable swap pixel;
 performing a swap of colour value between the donor pixel and the swap pixel; and
 repeating the selecting, searching and performing steps for each donor pixel.

The first image may be a picture image, which may be photographic or from any other source of full colour or monochrome continuous-tone image. They may represent still images or frames from a moving image. The second image may be a black on white representation of text, it may be a linear diagram, map, symbol or any other graphical object that can be represented as black on white lines. Where text is used, this may be either anti-alaised or alaised. Where the first image is a frame from a moving image, the second image may be one of a corresponding sequence in order to create moving text.

The present invention produces text-on-image overlays which exhibit an hitherto largely unexploited visual phenomenon, that is, overlaid text which is clearly legible seen up close, but which becomes nearly invisible when seen at some greater distance. Employed in the right spatial situation, e.g. where a poster is viewed by an observer who walks towards it, this produces a quite arresting visual experience. Observers, seeing the poster in the distance, wonder why they are presented with an image in an advertising context but without apparent message. When the observer has approached close enough, the text message appears, creating a graphical surprise.

The present invention achieves this text delineation by manipulating the chromatic and luminance properties already present in an image, as opposed to conventional text overlay methods where a portion of the image information is replaced (and thus lost) by the overlaid text.

BRIEF DESCRIPTION OF THE DRAWINGS

An example of the present invention will now be described with reference the following figures.

FIG. 1A shows an example image processed by the method of the present invention;

FIG. 1E shows a conventional solid text overlay;

FIG. 1F shows an example image processed by the present invention to produce a lighter text;

FIGS. 2A and B show redistribution of luminance values according to one example of the present invention;

DETAILED DESCRIPTION

The primary example of the present invention processes RGB bitmaps. This is the image format most common to the internal function of image manipulation and video effects processing systems.

Figure 1A:
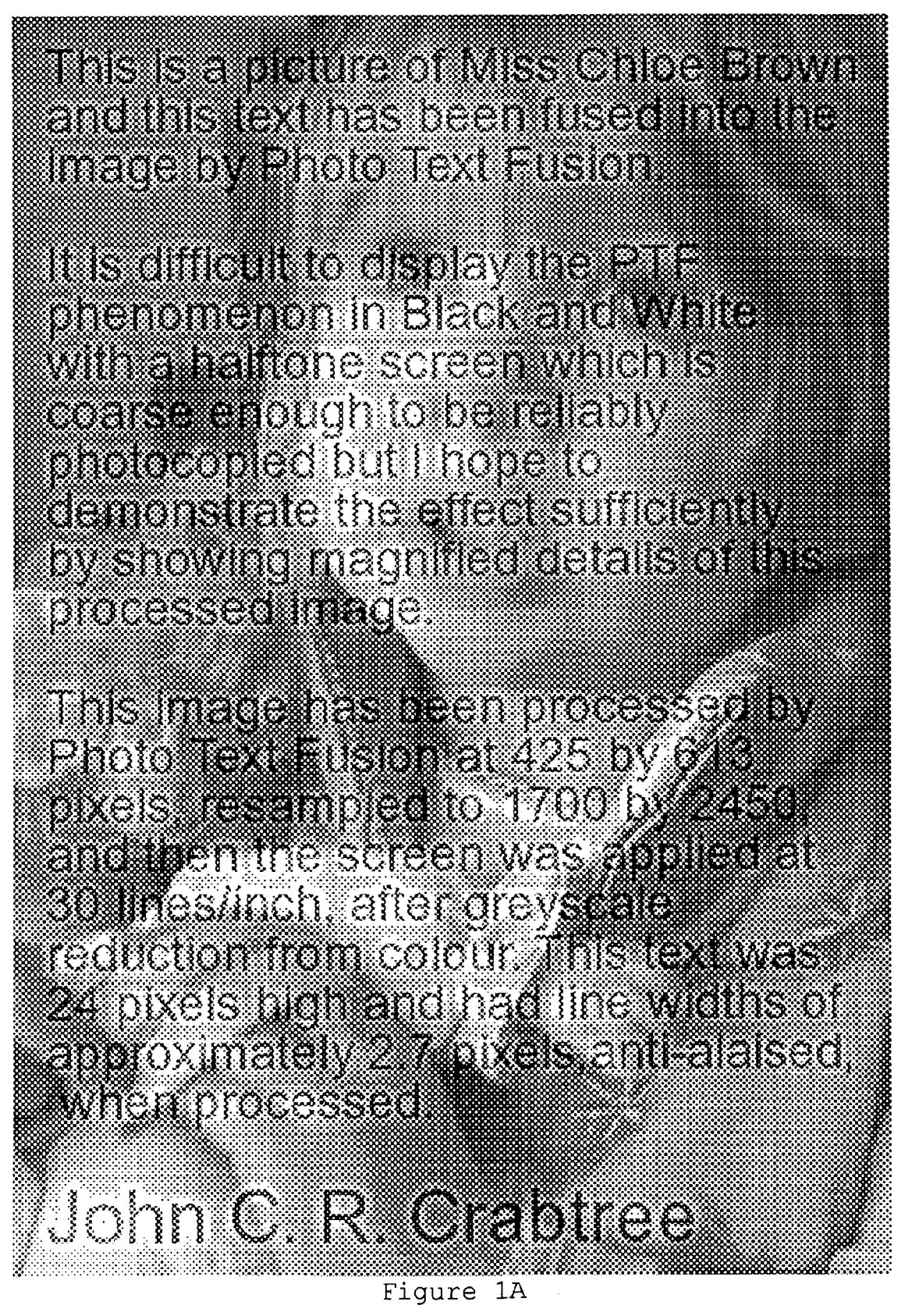
Figure 1B:
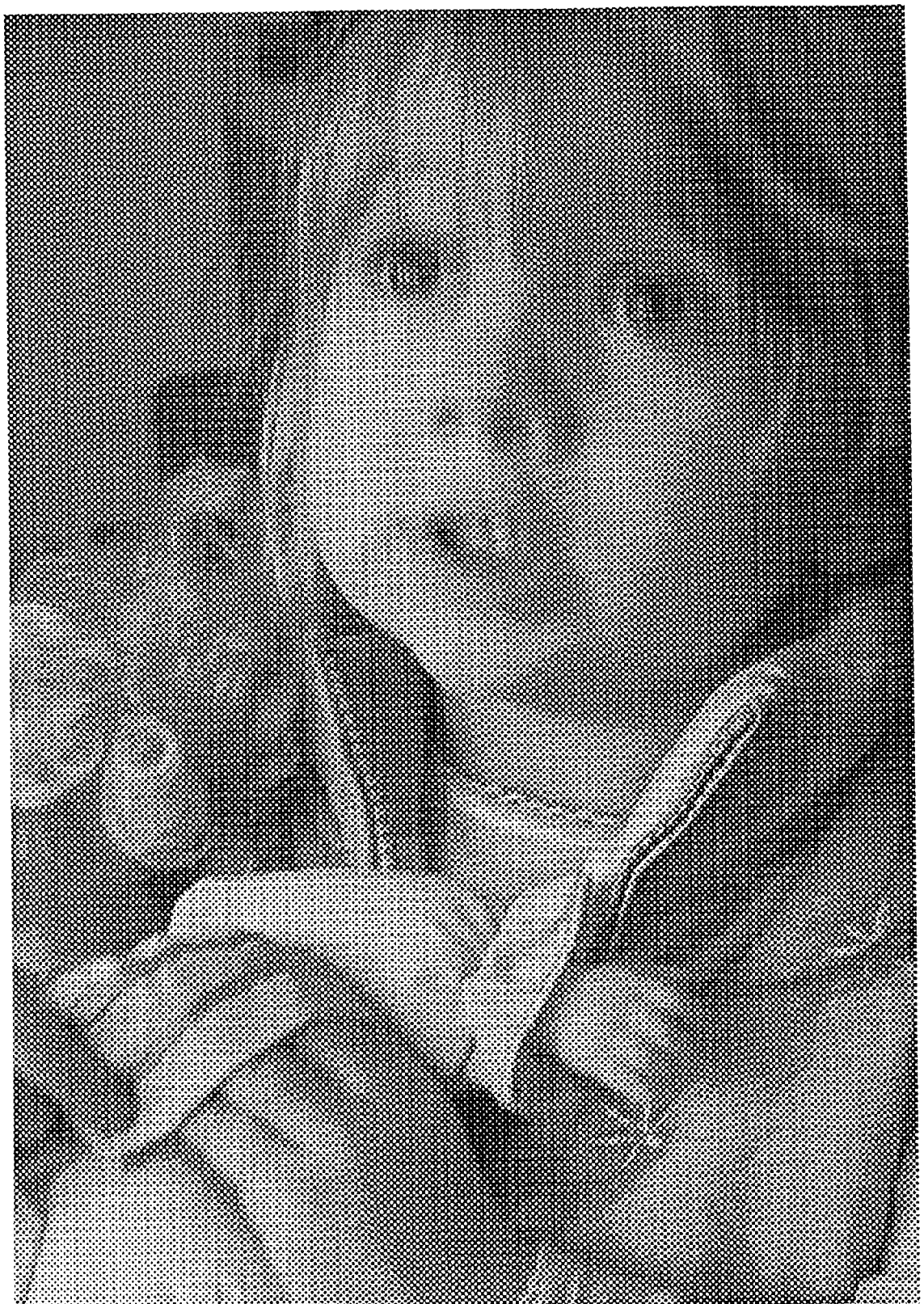
FIGS. 1B and C show the picture image and text image used to create the example image of FIG. 1A.
Figure 1D:
FIG. 1D is a magnified section of FIG. 1A.
Figure 1E:
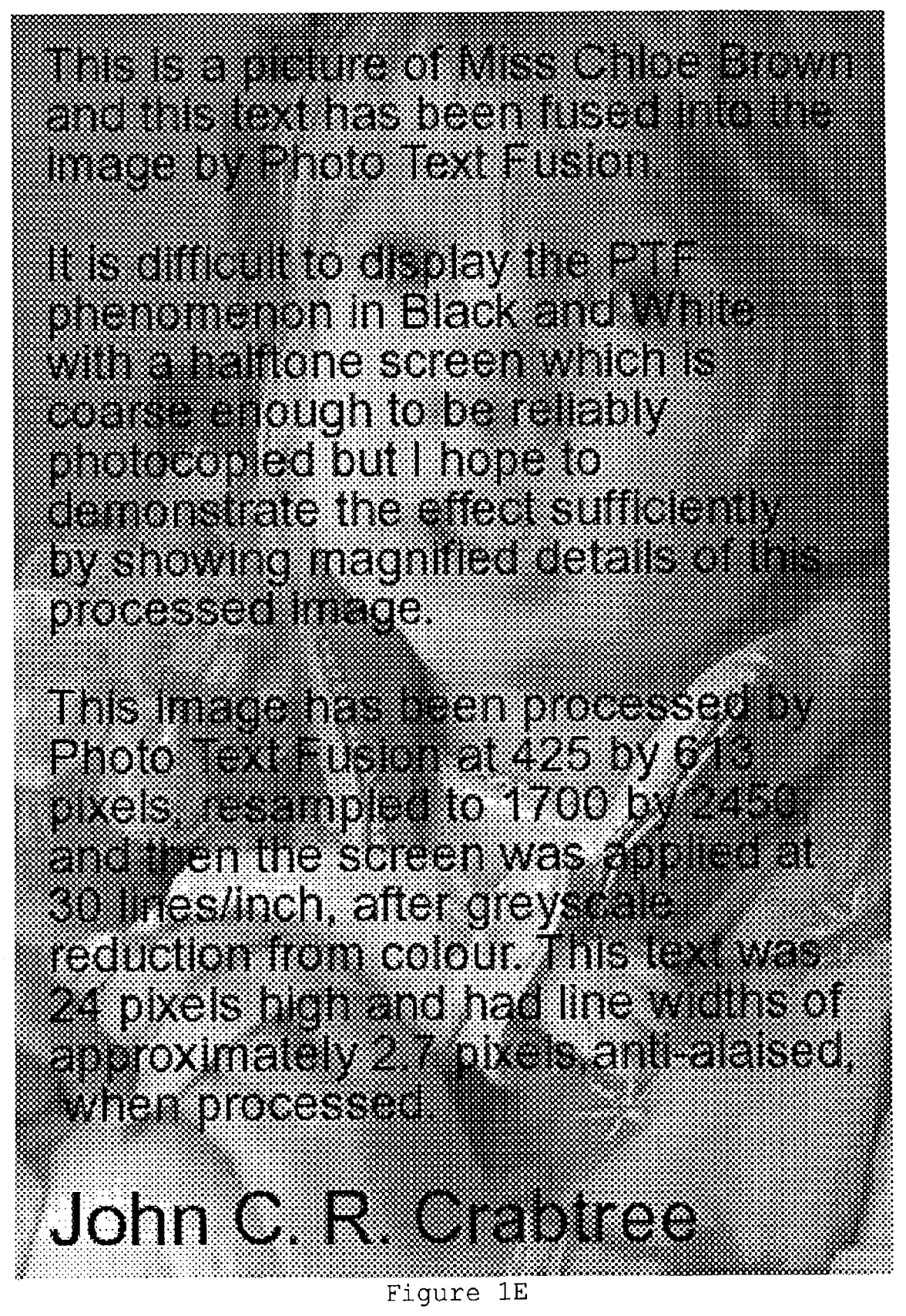

An example picture image is illustrated in FIG. 1B, the text to be composited with this image is shown in FIG. 1C and the resultant processed image is shown in FIG. 1A.

In a text/image composite of the present invention the text is revealed by moving luminance value from the "under-text" image pixels to "near-to-text" image pixels. While RGB values for "under-text" pixels and "near-to-text" pixels change, the aggregate RGB values for local groups of pixels remains the same as for the corresponding group in the original image, hence local groups of pixels have the same tone/colour appearance. The text is seen to disappear when the image is viewed at sufficient distance for the angular size of the text character line widths to be unresolved in human vision.

The image suffers loss of detail in the text regions up to the resolution of the text character size, but because local pixel group aggregate luminance values are constant, the image appears unobscured by the text when viewed at sufficient distance for the human eye not to resolve that detail. When seen from near enough for the eye to resolve the text, it is clearly readable.

The fundamental technical principal of the invention is that of local displacement of luminance value from pixel to pixel in an image bitmap, in order to create local contrast edges that reveal text characters, while maintaining local pixel group aggregate luminance values that preserve the image.

In FIG. 2A a sample patch of 10 by 11 pixels of a single colour channel of a picture image bitmap is represented. The pixel values represent a uniform vertical tone gradation from near black at the top to near full brightness at the bottom (0 to 255 being the full tone value range).

The heavy borders indicate "under-text" pixels of an overlaid letter "T" in a corresponding text image bitmap. The values in that bitmap are not displayed and for the purposes of this drawing we assume an alaised text representation such that each of the text pixels associated with the letter "T" has an identical luminance.

FIG. 2B illustrates the result of applying the process of the invention to only two sample "donor" pixels, which are drawn with triple line borders. The illustration assumes that only 5 neighbouring, or "receiver", pixels will be used in the redistribution of the luminance value, and in each case the receiver pixels found are drawn with dotted borders.

Figure 3:
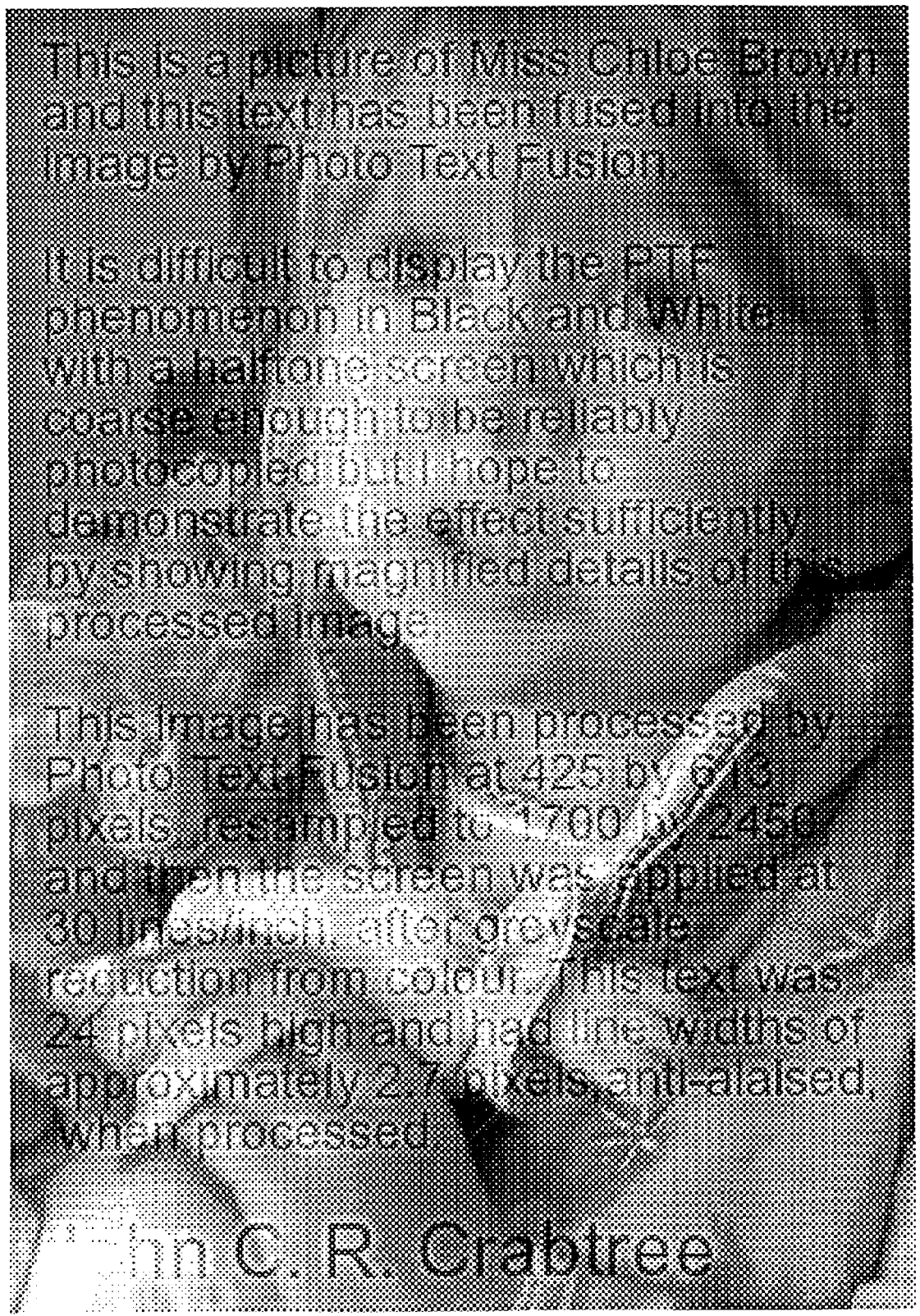
FIG. 3 illustrates a poor choice of original picture image which contains extremes of black and white.

In this case the highlighted pixel on the bar of the T, in this colour channel, has a luminance value of 45. This value is to be redistributed amongst the five potential receivers to reduce the luminance of this pixel to zero as illustrated in FIG. 2B. The example pixel, highlighted at the base of the T, has an original luminance in this colour channel of 220, it is surrounded by pixels of similar levels of luminance (i.e. approaching the maximum value of 255). The five selected receiver pixels, across which the under-text pixel is to redistribute its luminance, are unable to "receive" the full luminance value of 220 from the under-text pixel. Consequently, each of these neighbouring pixels are raised to a maximum value of 255 and the remainder stays with the under-text pixel at a value of 95. In each example of FIG. 2 it is evident that the 3 by 3 group of pixels (in bold type), centered on the example under-text pixels, have aggregate values equal to the aggregate values of the corresponding pixel groups before processing. When these are viewed closely the contrast between "under-text" pixels and "not-under-text" pixels will be visible, but when viewed at sufficient distance for the groups to merge on the viewer's retina, the colour/tone of the groups will appear the same before and after processing.

Where an image contains regions that are too nearly black or white (or near maximum and minimum luminance on all three colour channels), the system will fail because there is no tone range (or value range on any colour channel) available for creating contrast between text and non-text pixels. This is illustrated in FIG. 3. Put simply, if a region of the image is black then under-text image pixels in that region cannot become any blacker. It follows that near-to-text pixels cannot be made lighter without altering local aggregate pixel luminance.

This problem can be avoided by pre-processing of the image to avoid its containing under-text areas, which are too nearly black or white at the expense of a sacrifice of image tone contrast and/or colour saturation.

Since the invention treats each text pixel individually, these text pixels may each have their own luminance value associated with them. This means that anti-alaised text can be treated in a similar manner to alaised text and that anti-alaised text image bitmaps will render as anti-alaised in the resulting image.

Figure 1F:
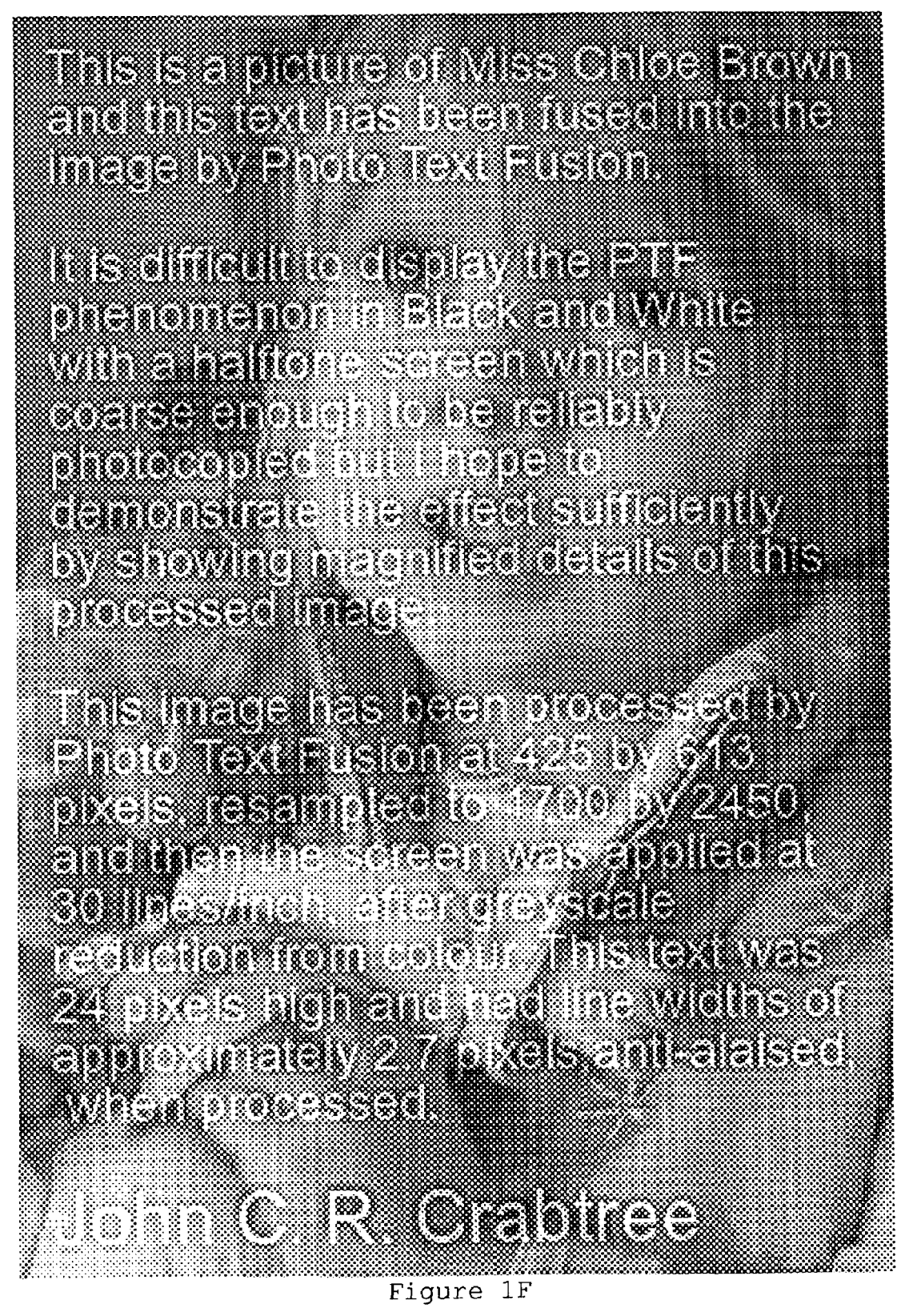

The current example produces a result where the text is darker than the image background. An alternative example can result in the text being lighter than the image background and that example employs the same technical principal (see FIG. 1F).

Other variations that extend functionality while employing the same principal will be explained later.

Figure 4:
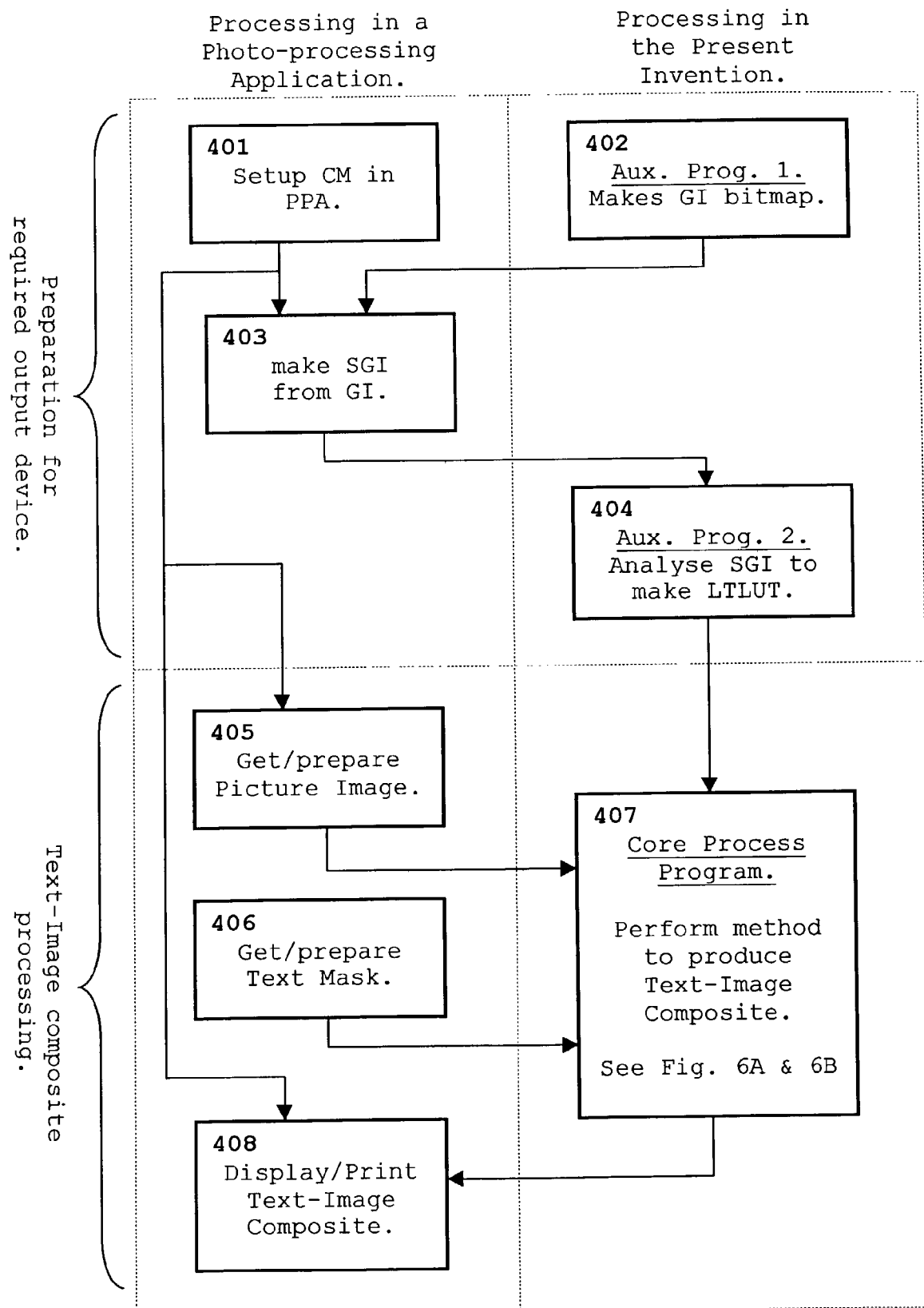
FIG. 4 is a flow chart illustrating the procedural components of the image processing method, and how these components relate to the use of an existing photo-processing software application.

FIG. 4 employs a flowchart to illustrate one possible interaction of the process steps of the present invention with the use of an existing photo-processing application (PPA). Any PPA can be used which employs a bitmap (as opposed to a vector) representation of pictures, which can produce bitmaps representing texts, and which has colour management (CM) functionality, that is, the capability of employing device specific colour profiles. These permit the accurate printing or display of colour images which maintain linear colourimetric values in relation to the RGB bitmap values that represent them.

In this flowchart the logical steps are divided into those which are carried out in the chosen photo-processing application (on the left), those that are carried out in the present invention (on the right), the logical steps required to prepare for a given output process (above), and the steps required to process individual composites (below).

In step 401 the CM of the PPA is set-up by invoking the colour profile of the output device to be used.

In step 402, auxiliary program 1 of the present invention constructs an RGB image bitmap consisting of an ordered set of every possible colour in the RGB gamut, the Gamut Image (GI).

In step 403 the GI is opened in the PPA and reconstructed so that all RGB values are scaled to fall within the gamut of the output process. This is saved as the scaled gamut image (SGI).

In step 404, auxiliary program 2 of the present invention analyses the SGI to construct a file of an array representing a comprehensive look-up-table containing, for every "in gamut" RGB colour value set, the maximum colour value displacement which may be applied positively and negatively to the given value without producing a colour which lies outside the gamut of the output process. It may be called the luminance transfer look-up-table (LTLUT). This LTLUT will be employed by the "core program" of the present invention to limit luminance transfer between pixels in order to ensure that new colours are not created which lie outside the gamut of the output process.

Figure 5:
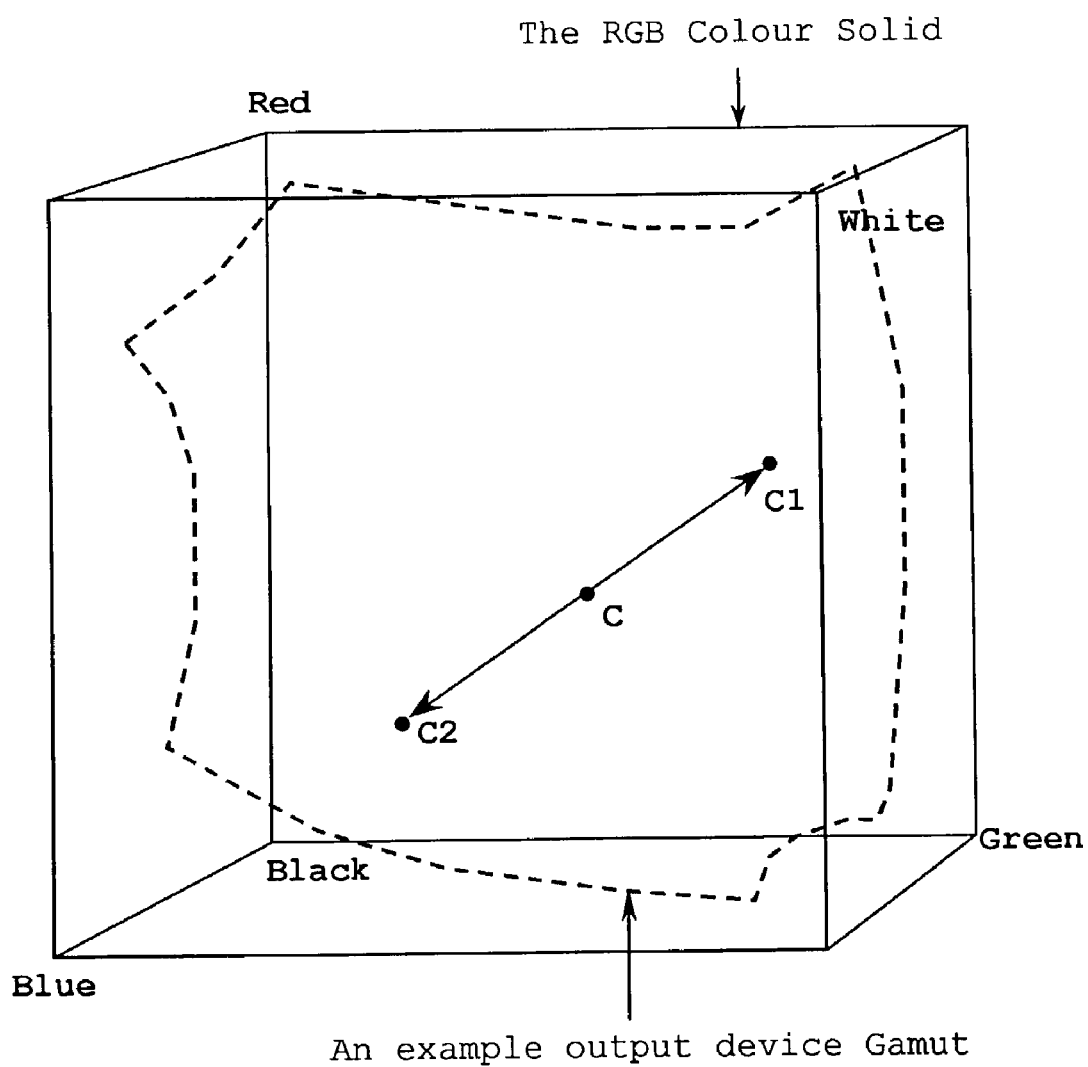
FIG. 5 illustrates the construction of the luminance transfer look-up-table (LTLUT)

FIG. 5 shows a colour C within the device gamut, and the colours C1 and C2 derived such that (1) both are also within the device gamut, (2) the displacements of C1 from C and C2 from C are equal but opposite in each colour dimension and (3) the displacements C1 from C are positive in all three colour dimensions. The LTLUT stores the C1 from C displacement of the original colours before they were compressed into the device gamut.

The analysis required to produce the primary version of the LTLUT (in which the contained gamut-safe colour displacements are the maximum possible) requires interpretation of ICC colour profiles, procedures which are in the public domain, hence this analysis cannot be made part of the claims of the present invention.

The LTLUT may be further processed so a group of LTLUTs are available that give different graphical effects in the final composite. In one example the values are limited to some constant thereby enforcing an upper limit on the contrast that develops between under-text and near-to-text pixels. This is useful in "levelling" the apparent visibility of the text over the composite surface. In another example the values are weighted differently on each colour channel, causing useful colour effects in the composite text rendering.

In step 405 a picture image bitmap is prepared for compositing by invoking the CM function of the PPA to ensure that none of the original RGB values in the picture lie outside the gamut of the output process.

In step 406 a bitmap of the text mask image is prepared for compositing. Colour management is irrelevant to this stage so the text mask could be prepared in any appropriate application.

In step 407 the core process of the present invention constructs the picture/text composite from the prepared picture and text mask images, (see FIG. 6 and the detailed explanation of the core process that follows).

In step 408 the composite is printed or otherwise displayed by the PPA utilising CM to interpret the composite, given the chosen output process colour profile.

Figure 6A:
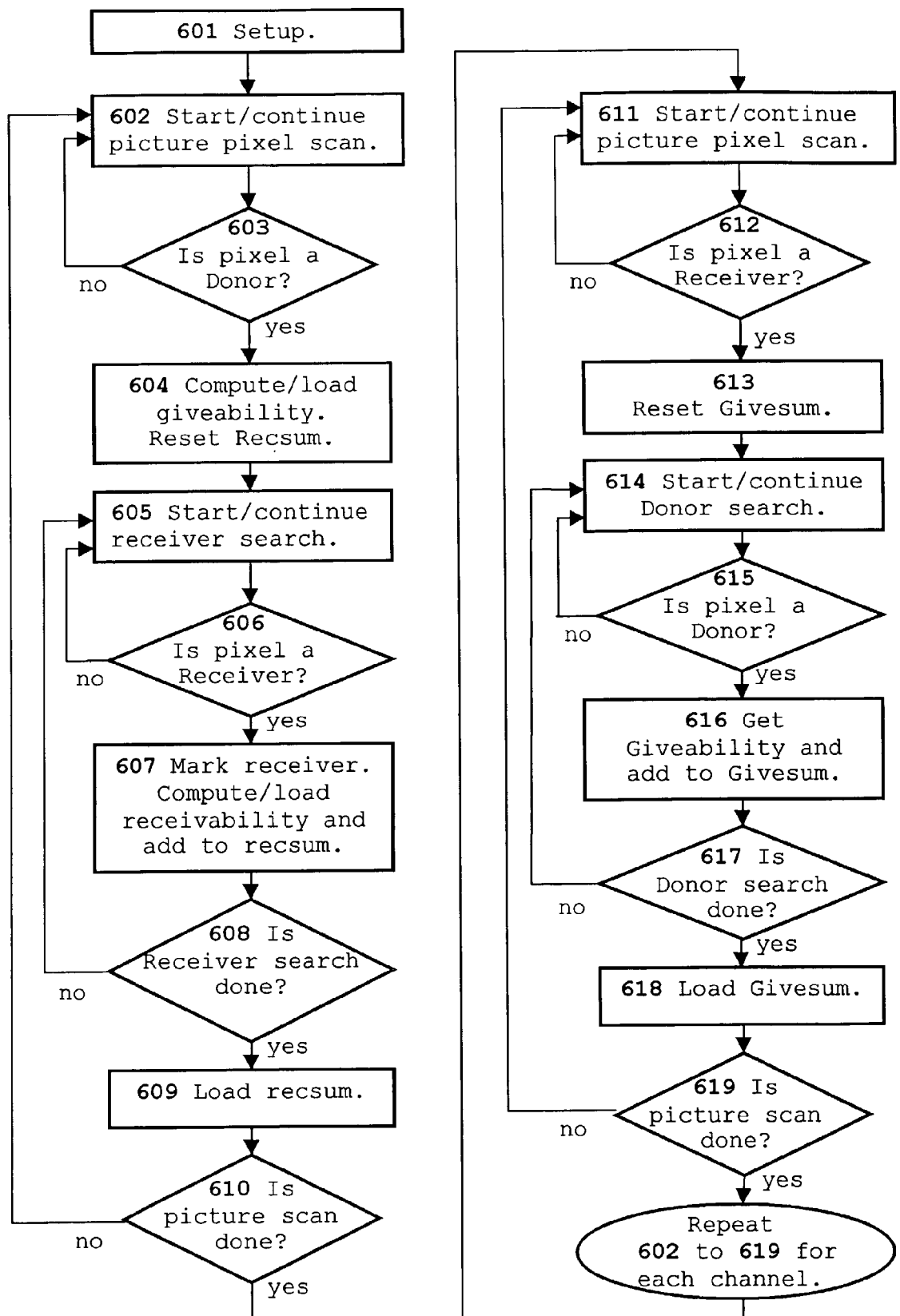
FIGS. 6A and 6B illustrate the procedural steps of the core component of the process.
Figure 6B:
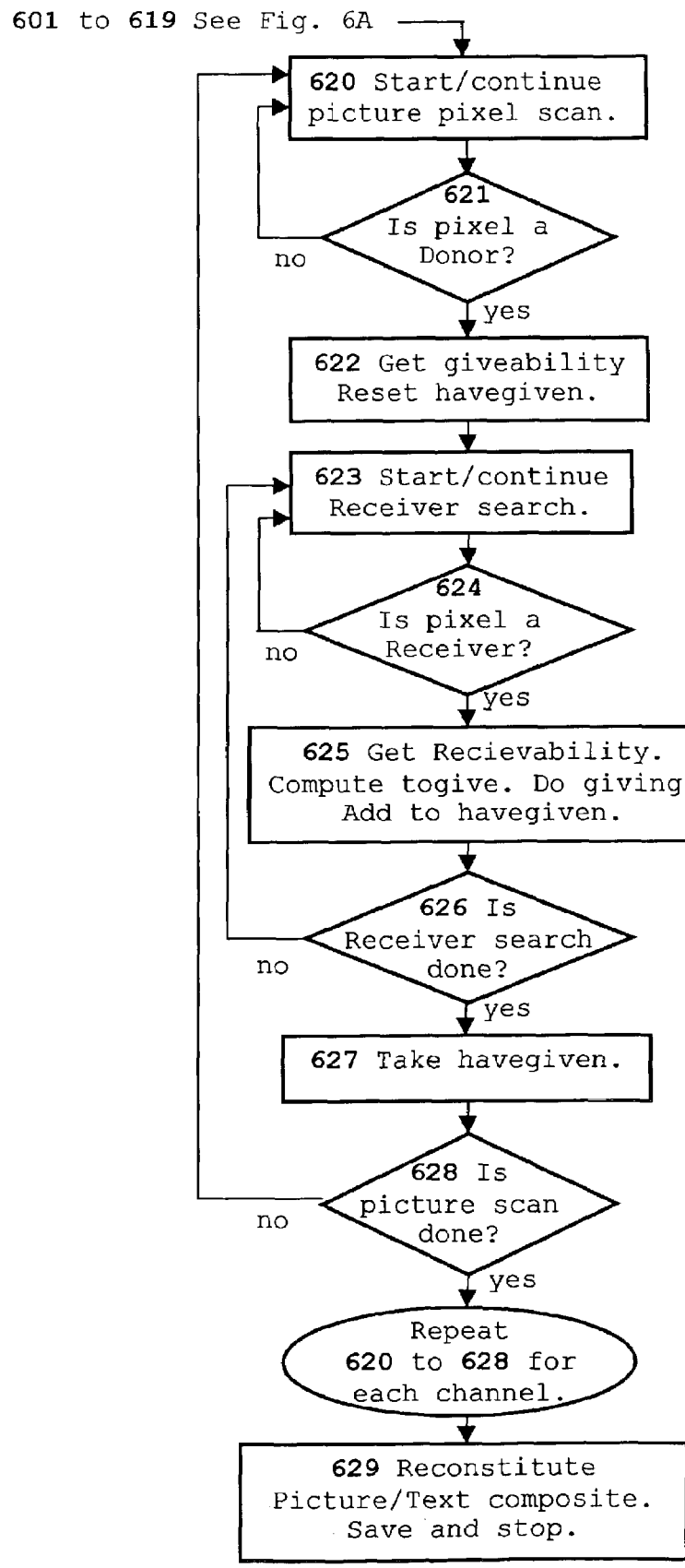

FIGS. 6A and 6B illustrate the procedural steps that constitute the core process of the present invention. Steps 601 to 619 are repeated for each of the RGB colour channels, and are analytical preparation for the luminance value transfers. These take place in steps 620 to 629, which are also repeated, for each colour channel.

Step 601 sets up the data required as follows:

The picture image bitmap is loaded and de-constructed into three arrays representing its RGB colour channel bitmaps.

The text mask image is loaded and reconstructed as an array with values −1.0 to +1.0 representing the black to white values for anti-alaised text.

The LTLUT is loaded.

Figures 7A, 7B:
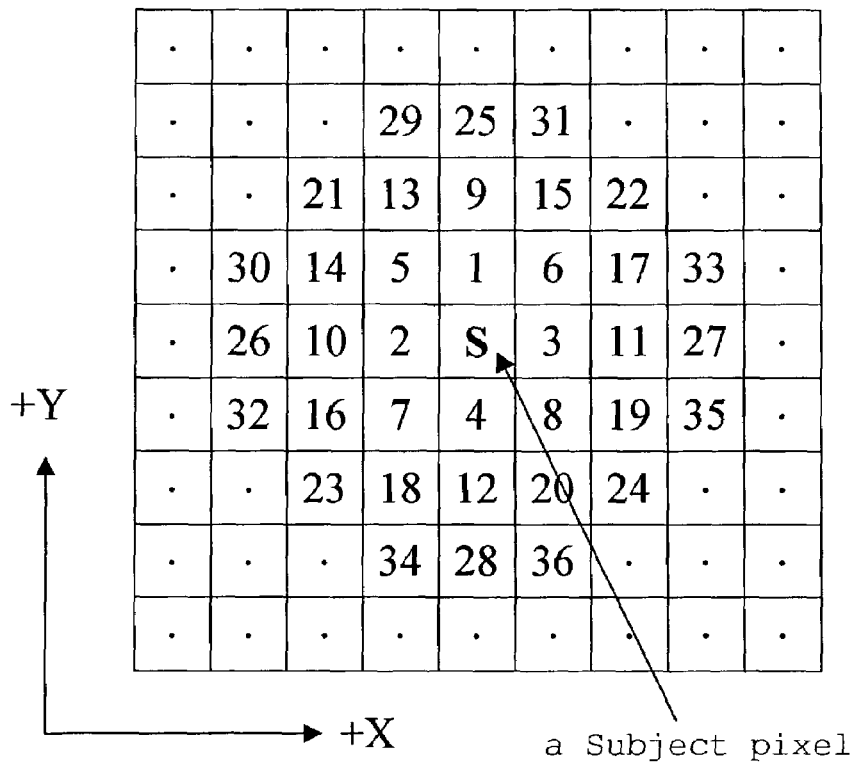
FIGS. 7A and 7B illustrate a search field which defines the eligible receiver pixels with respect to a given donor.

A pre-existing data array SearchField, is loaded. Searchfield contains x and y pixel offset values for use in the search for receiver pixels that are active to a donor pixel. Alternative examples of the SearchField array may define a circular or other shaped group of pixels. FIGS. 7A and 7B illustrate the first 36 pixels and corresponding displacements for a symmetrical, centred, circular SearchField. Different SearchField shapes produce a range of styles in the appearance of the luminance transfer halo.

The parameter SearchDepth is set to determine how many elements of the SearchField are used.

Two more arrays, GivRec and Sums, are initiated with elements corresponding to each element in the picture image arrays.

In step 602 a pixel scan of the picture image is initiated.

Step 603 tests each pixel to determine if it is a potential luminance donor by testing the corresponding value in the text mask array for being less than zero (values which represent anti-alaised under-text-pixels darker than the mid-value).

In step 604 the amount of luminance that can be donated (its Giveability) is calculated by finding the permitted transfer value in the LTLUT and reducing this as the product of the absolute value of the corresponding text mask value. This Giveability value is stored in the GivRec array. A variable RecSum (for receivability sum) is (re) set to zero.

In step 605 a search is initiated for receiver pixels corresponding to the found donor. X and Y displacements found in the SearchField array are added to the position of the donor giving the position of the proposed receiver.

Step 606 determines if the proposed receiver is valid by testing the corresponding value in the text mask array for being greater than zero, i.e. a not-under-text pixel or an under-text pixel of lighter than anti-alaised middle value.

In step 607 the Receivability of valid receivers is calculated by finding the permitted transfer value in the LTLUT and reducing this as the product of the value of the corresponding text mask value. This Receivability value is stored in the GivRec array. The RecSum variable is incremented by Receivability.

Step 608 determines if the SearchDepth limit to the receiver search has been reached.

If the search is complete, step 609 loads the RecSum value in the Sums array at the position corresponding to the found donor.

Step 610 determines if the picture scan is complete.

Steps 611 to 619 duplicate the pattern of steps 602 to 609, but find all receiver pixels and for each receiver, the corresponding eligible donors.

In order that the same set of donors to a given receiver are found as had previously been found when searching for receivers from a given donor, the values in SearchField are reflected (x =−x and y =−y). This is necessary in case the SearchField is irregular or unsymmetrical.

For each receiver, its Receivability is calculated as at 607 and stored in the GivRec array. For each of the receivers' found donors, the Giveability of the donor is calculated as at 604 and the sum of these Giveability values is stored in the Sums array in the position corresponding to the found receiver.

Steps 602 to 619 are repeated for each of the RGB colour channels. When this is complete the GivRec array contains the maximum Giveability or Receivability on each channel for each found Donor and Receiver pixel and the Sums array contains, for each of these, the sum of the corresponding found set of pixel values for Receivability or Giveability.

Steps 620 to 629 execute the luminance value transfers as follows.

At 620 another scan of the picture image is initiated.

Step 621 filters for donor pixels as at 603

Step 622 gets a found donor's Giveability from the GivRec array and (re)sets a variable Havegiven to zero.

Step 623 initiates a search for receivers as at 605.

At step 624 the proposed receiver is validated or rejected as at 606.

Step 625 gets the Receivability of the validated receiver from the GivRec array and determines the "safe" luminance transfer value togive from the donor to this receiver as the smaller of the following: TogiveA=Giveability (of the donor) * Receivability (of this receiver)/the sum of Receivability values of all receivers taking luminance from this donor, or TogiveB=Receivability (of this receiver)*Giveability (of the donor)/sum of Giveability values of all donors giving luminance to this receiver. Togive is then added to the corresponding picture image colour value and Havegiven is incremented by Togive.

Step 626 determines if the receiver search is complete for this donor. All receivers taking from this donor will have taken their share of its giveable luminance value.

At step 627 the donor's corresponding picture image colour value is reduced by Havegiven.

Step 628 determines if the picture image pixel scan is complete.

Steps 620 to 628 are repeated for each colour channel.

At step 629 the picture image/text composite RGB bitmap is reconstituted from the colour channel arrays and saved. The core program ends.

In the principal example described above, the core process is applied equally to each of the 3 colour channels that constitute the picture image. If the 3 colour channels are treated differently, some interesting and graphically useful results occur.

If the blue channel (for instance) is not processed, the result has text appearing with a colour contrast as well as a tonal contrast, with respect to the image background. Text on a colour neutral region of the image appears bluish on a yellowish background.

In an example that allows the giving/receiving direction to be reversed from that described in the primary example, the result will be text that is lighter than the surrounding image (as noted above and illustrated in FIG. 1F). If an example is prepared where both directions of giving/receiving are available and the 3 colour channel arrays are processed with (for instance) two forward and one reverse giving/receiving, the resultant image can have a very strong colour contrast between the text and the non-text pixels.

In a further example, the factors determining which channels are processed or not processed or reverse processed are made to depend on the image region relative colour values. If, for instance, colour channel processing is suppressed or reversed for that colour channel which corresponds to the maximum value colour channel of the donor pixel, the result will be text with complementary colour contrast in all image colour regions. In red regions of the picture the text will appear redder against a green-bluish background, while in green regions of the picture text will appear greener against an orange-reddish background, and in the blue regions of the image the text will appear bluer against a yellowish background.

These variant examples maintain local aggregate pixel luminosity and thus whatever effects are produced in apparent text colour, the colours will merge to make the original image appear in the result when seen at a distance.

These colour effect variations are particularly dramatic when applied to black & white or tinted monochrome images (represented by RGB bitmaps). Seen up close the texts can be very colourful, but these colours merge back into the monochrome image when seen at a distance.

Another useful example employs a partial compromise of the principal of maintaining local aggregate pixel luminosity. In this example, under-text regions that cannot be processed to reveal text because they are too nearly black or white (or polarised on all colour channels) are allowed to give luminance that they do not have. This allows the text to be revealed without overall contrast reduction or colour desaturation pre-processing of the subject image. Image fidelity suffers in these regions of the picture, but this may be a worthwhile compromise. For automatic production of multi-frame images in film/video production this would be an advantage because the designer/editor cannot consider or test proof the result for every frame.

The primary example and the variations described above apply the technique of the invention to RGB bitmaps of the image and text. The technique can also be applied to any other colour space that might be used to represent an image and which permits linear calculations effecting equal displacement of colour value within the image.

Another example has the same general structure and flow of the primary example, but produces images from palettised image data like GIFs. In this example local displacement of luminance value from pixel to pixel in an image map, in order to create local contrast edges that reveal text characters, while maintaining local pixel group aggregate luminance values that preserve the image is achieved by pixel for pixel swapping of palette colours between text and non-text image pixels. The program must be given a "colour palette order" that forms the basis of pixel colour swap decisions. The "colour palette order" is carefully chosen to put the colours in ascending tonal order. As under-text pixels are processed the near-to-text pixels are compared and the furthest down (or up) the colour order is chosen for the swap. This method cannot reveal text in image regions composed of only one colour from the palette. When the image is "palettised" from its original representation, the palette must be carefully chosen so that all under-text regions in the image become represented by a mix of at least two colours from the palette. Automatic palette colour determination does not produce the required result.

Blurring of the photographic component of the composite may be reduced by filtering proposed receiver pixels for those that are in the same colour/tone region to the donor pixel. This is achieved by making available an additional array which represents a non-dithered, hard-boundaried version of the RGB bitmapped image, which functions as a colour/tone region map. To generate this colour/tone region map, an image may have a common graphical filter applied to it which divides the image into a specified number of colours which are applied to the image as unmixed regions that have boundaries corresponding to the contrast edges of the original image. This map is created outside the above described method using standard image processing software. The actual colours are irrelevant except in providing region difference information. The giving/receiving luminance value is applied to the RGB channel bitmaps as described in the earlier method, but receivers are not active to donors that lie across a colour region boundary in the region map. The boundaries are thus preserving detail as they cross text and text "halo" areas in the composite result. Use of this technique may be counterproductive if "undertext" regions contain details in the region map of similar scale to the text line widths, since preservation of this image detail can obscure that text. Manual correction of an automatically generated region map may be implemented to achieve enhanced results.

All of the examples of the technique described above could be employed in stand alone applications or in "plugins" for existing graphical applications that process images.

The technique of the invention could also be implemented as a digital electronic device for overlay of text on image in a real-time video environment.

The invention claimed is:

1. A method for processing an image comprising the steps of:
   providing a first image and a second image;
   locating donor pixels in the first image which correspond to active pixels on the second image;
   selecting a channel of the first image;
   selecting a donor pixel;
   searching the pixels, in the first image, in the region of the donor pixel, to determine suitable receiver pixels;
   performing a transfer of luminance from the donor pixel to the receiver pixels through the receiver pixel array; and
   repeating the donor pixel selection, the searching and the performing steps for each donor pixel.

2. The method according to claim 1, wherein the searching and performing steps are performed in a predetermined sequence.

3. The method according to claim 2, wherein the method is repeated for at least one additional colour channel.

4. The method according to claim 3, wherein the step of searching for suitable receiver pixels uses predetermined shaped templates.

5. The method according to claim 4, wherein the shaped template is geometrically offset to the donor pixel in a predetermined manner.

6. The method according to claim 5, wherein the local pixel group aggregate luminance level is maintained to preserve the original image.

7. The method according to claim 2, wherein the step of searching for suitable receiver pixels uses predetermined shaped templates.

8. The method according to claim 7, wherein the local pixel group aggregate luminance level is maintained to preserve the original image.

9. The method according to claim 7, wherein the shaped template is geometrically offset to the donor pixel in a predetermined manner.

10. The method according to claim 9, wherein the local pixel group aggregate luminance level is maintained to preserve the original image.

11. The method according to claim 2, wherein the local pixel group aggregate luminance level is maintained to preserve the original image.

12. The method according to claim 3, wherein the local pixel group aggregate luminance level is maintained to preserve the original image.

13. The method according to claim 4, wherein the local pixel group aggregate luminance level is maintained to preserve the original image.

14. The method according to claim 1, wherein the method is repeated for at least one additional colour channel.

15. The method according to claim 14, wherein the local pixel group aggregate luminance level is maintained to preserve the original image.

16. The method according to claim 14, wherein the step of searching for suitable receiver pixels uses predetermined shaped templates.

17. The method according to claim 16, wherein the local pixel group aggregate luminance level is maintained to preserve the original image.

18. The method according to claim 16, wherein the shaped template is geometrically offset to the donor pixel in a predetermined manner.

19. The method according to claim 18, wherein the local pixel group aggregate luminance level is maintained to preserve the original image.

20. The method according to claim 1, wherein the step of searching for suitable receiver pixels uses predetermined shaped templates.

21. The method according to claim 20, wherein the local pixel group aggregate luminance level is maintained to preserve the original image.

22. The method according to claim 20, wherein the shaped template is geometrically offset to the donor pixel in a predetermined manner.

23. The method according to claim 22, wherein the local pixel group aggregate luminance level is maintained to preserve the original image.

24. The method according to claim 1, wherein the local pixel group aggregate luminance level is maintained to preserve the original image.

* * * * *